Feb. 23, 1954 — M. B. LUCKER — 2,670,174
PUSHING OR PULLING JACK
Filed June 9, 1949
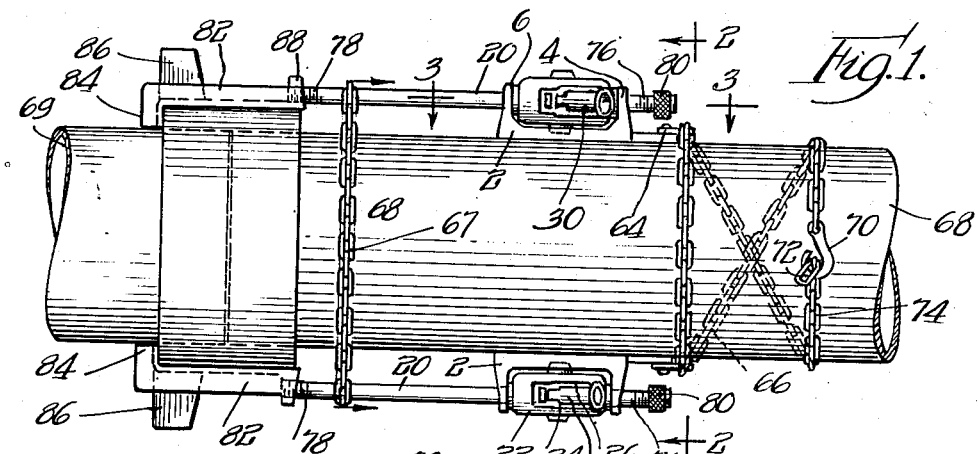
Fig. 1.
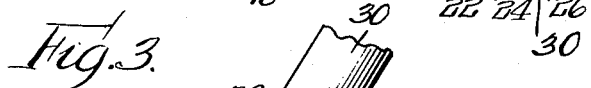
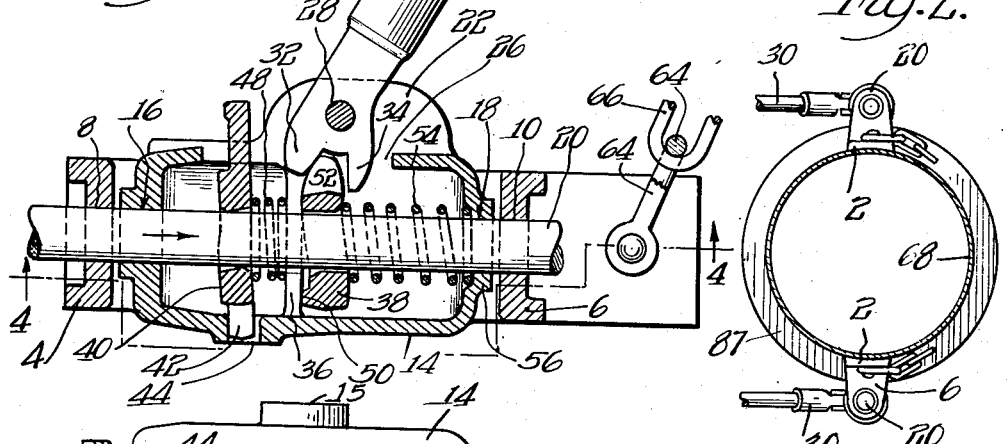
Fig. 3. Fig. 2.
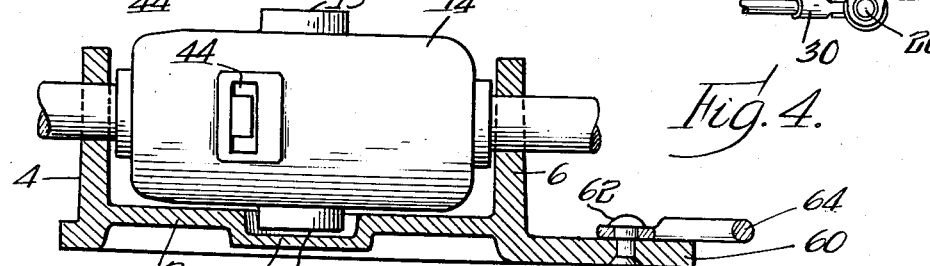
Fig. 4.
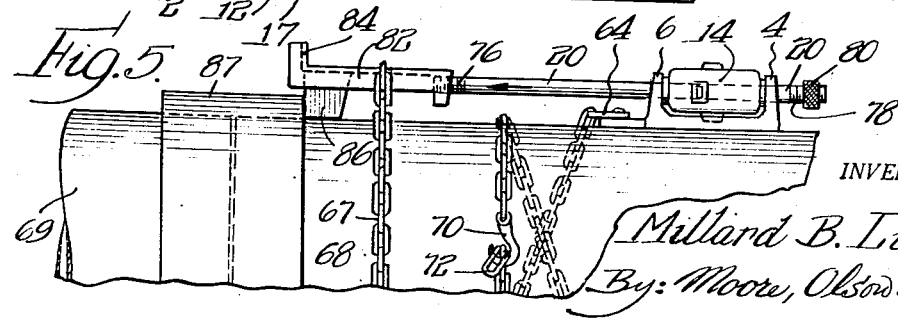
Fig. 5.
INVENTOR.
Millard B. Lucker
By: Moore, Olson & Trexler
attys.

Patented Feb. 23, 1954

2,670,174

UNITED STATES PATENT OFFICE 2,670,174

PUSHING OR PULLING JACK

Millard B. Lucker, St. Joseph, Mich., assignor to Auto Specialties Manufacturing Company, St. Joseph, Mich., a corporation of Michigan Application June 9, 1949, Serial No. 97,967

11 Claims. (Cl. 254—29)

This invention relates to pushing and pulling devices.

The invention particularly relates to a pipe jack and, in the specific embodiment of the invention herein, is adapted as a pipe joint puller and pusher.

One of the objects of the invention is to provide a pipe jack which is constructed and arranged so that a single jack assembly or device may be used either as a right hand or a left hand jack in a usage or adaptation which requires a pair of jacks, one disposed on either diametrical side of the pipe for pulling a pipe joint frictionally into position over the abutting ends of pipes to be joined together or, alternatively, whereby the jacks by simple adjustments of certain of their parts may be reversed so that the same may operate or function as pushers for removing the joint from position enveloping the abutting edges of two adjacent pipes.

Yet another object of the invention is to provide a simple type of friction jack construction which includes a bracket or cradle adapted to be made fast to a pipe section as for instance by means of a chain which secures a pair of such cradles to substantially diametrically opposed sides of a pipe, in combination with a preferably elongated housing having registering openings in its ends and a pair of clamping means therewithin and wherein the clamping means and the housing receive therethrough an elongated shaft, the housing having operating means pivotally associated therewith and operable to shift one of the clamps called an actuating clamp for causing the elongated shaft to be removed longitudinally of and through the elongated housing and relatively to the pipe, one of the ends of the elongated shaft detachably carrying a substantially hook-like member adapted to engage the edge of the pipe joint whereby, upon operation of the clamp actuating mechanism, frictionally to pull the pipe joint over formed by the abutting edges of such pipe and the end of the next adjacent pipe so as frictionally to form a seal therebetween.

Another object of the invention resides in providing in the above type of construction, means whereby the housing may be turned about the axis of the elongated shaft passing therethrough a limited number of degrees relatively to the cradle or bracket upon which said housing is mounted whereby to permit the adjustable positioning of the clamp operating actuating lever pivotally mounted on the housing, relatively to the adjacent periphery of the pipe whereby such lever may be conveniently operated despite the fact that the bracket carrying such housing and the housing itself are substantially rigidly clamped to and adjacent the periphery of the pipe.

Yet another object of the invention resides in providing the bracket member which is adapted to be clamped to one of the pipe sections with a recess or well and in providing the housing which carries the actuating and holding clamps and through which the elongated shaft passes, with a pair of substantially diametrically opposed, outwardly extending lugs, one of which is adapted to be disposed so as to enter the well or recess of the bracket and limit the turning of the housing about such elongated shaft to a limited number of degrees only and thus while preventing substantial relative rotation between the housing and its bracket, yet allows a limited rotation, illustrated herein, at five percent more or less, which limited rotation provides means whereby the cam actuating lever pivoted to the housing may be operated back and forth in varied positions of the bracket and housing which will chain or otherwise stationarily clamp to one of the pipe sections.

Yet another object of the invention resides in providing a pushing and pulling device or a jack operable in pairs on opposite sides of a device to which portions of each of the jacks are clamped and wherein each of said jacks is constructed and arranged so that by a simple unthreading operation the fixtures threaded to the opposite ends of the long rod which passes through the friction clamps operable within the housing of the jack may be removed and interchanged end for end so that the jack first operating as a puller may then be operated as a pusher. By means of this construction, not only may a single jack be duplicated to form a pair of identical jacks for use as right and left handed jacks to be positioned on opposite sides, for instance of a pipe or other object and clamped thereto and which can operate either as pushers or pullers for pulling or pushing an object relatively to the object to which said jacks are fastened, clamped or chained.

These and other objects of the invention will be apparent from a perusal of the following specification taken in connection with the accompanying drawings, wherein:

Figure 1 is a plan view showing a pair of the improved jacks operating as a pushing and pulling mechanism for pulling a collar or pipe joint frictionally over the abutting edges of two pipe sections to be thus held in position;

Figure 2 is a sectional view taken on the line 2—2 of Figure 1;

Figure 3 is an enlarged sectional view taken on line 3—3 of Figure 1;

Figure 4 is a sectional view taken on line 4—4 of Figure 3; and

Figure 5 is a side elevational view showing the device used in a pushing operation.

Referring now to the drawings in detail, the frictionally operated jack mechanisms herein shown and described are constructed as to parts thereof somewhat along the lines of my prior Patents 2,227,395, 2,227,396, and 2,227,397. However, the constructions of such prior patents are altered in certain constructional features in a manner such that they may be operable as pulling and pushing devices having various adaptations.

As an illustrative embodiment, however, I have shown one adaptation of a pair of my prior jack constructions wherein the constructional features are so arranged as to adapt the pair of jacks for the function of both pulling or pushing a pipe joint or sleeve into frictional tight fit enveloping and overlying the juxtaposed abutting edges of two pipe sections or, alternatively, for use in pushing such sleeves out of position from frictional overlapping enveloping engagement with said abutting edges of said pipe sections.

The particular features herein claimed and forming the subject matter of the present invention reside in the construction of a single jack wherein a pair of identical jacks may be used without further changes as a set or pair and adapted to be operably fastened to, clamped or chained to and on diametrically opposed sides of a pipe section, the jack including operable means for actuating hook-like members engaging the edge of the sleeve forming the pipe joint for drawing the same into position enveloping and overlying the juxtaposed edges of the adjacent pipe sections. In addition, the invention includes means whereby upon simple adjustment without structural alterations, each of the jacks is converted into a pusher rather than a puller for removing a pipe section from frictional tight enveloping relation over the juxtaposed edges of two pipe sections.

For purposes of illustration, it is to be understood that a set of jack assemblies comprises two of the same. Each jack of the set comprises a cradle-like base or bracket comprising a bottom portion 2 of somewhat arcuate curvature in a direction transversely of its elongated axis whereby the base is adapted snugly to lie upon the curved periphery of a pipe section. The base portion 2 is provided with two opposed lugs 4 and 6, each such lug being formed with an opening, the openings being 8 and 10, respectively, through which an elongated rod, as hereinafter described, is adapted to project. In addition the base member 2 is provided with a depressed central portion 12 forming a well or recess for a purpose hereinafter set forth. Each jack also includes a substantially cylindrical housing 14. The housing is generally hollow and is provided at its ends with openings 16 and 18 for the reception of an elongated rod 20 which rod 20 performs the function of a pushing or pulling instrumentality. In addition, each housing 14 is provided with a pair of parallel disposed ears 22 and 24 providing an elongated space therebetween herein designated as at 26. Fixed between the spaced parallel ears 22 and 24 is a pivot pin 28 to which is pivoted an actuating lever 30. The actuating lever 30 has on its inner end a pair of spaced teeth 32 and 34 which may be formed as involute teeth, if desired. In addition, diametrically opposite portions of the housing 14 at its center are provided with outstanding abutments 15 and 17 which are adapted selectively to lie within the well 12 of the base and which are readily detachable from the well by simply lifting the housing from the base, and these abutments comprise means selectively to lie in the well 12 of the base to limit angular turning of the housing with respect to the inner upstanding side walls of the well to a limited arcuate extent, say about five degrees in angular extent, whereby to provide slight angular adjustment of the housing relatively on the base and to the base.

The elongated shaft 20 is operably positioned and passes through the openings in the outstanding lugs 4 and 6 of the cradle or bracket 2 through the end openings 16 and 18 of the housing and axially through the housing. The internal walls of the housings are preferably provided with a partition member 36 which forms an abutment for purposes hereinafter set forth. Friction gripping devices such as washer-like cams are disposed in the housing and the rod 20 passes through central openings formed therein. As shown in my prior patents and likewise shown herein, these two cams are formed as an actuating cam 38 and a holding cam 40. The inner walls of the openings formed in the cam are provided with sharp or relatively sharp biting edges which are thus adapted frictionally to grip the periperal walls of the long rod 20. The specific formation of these cams is disclosed in my prior patents and specifically in those patents hereinbefore mentioned as well as others of my prior patents. The holding cam 40 carries an extension lug 42 which engages in an opening or slot 44 formed in the housing diametrically opposite the upper portion of the opening 26. One of the walls of this slot forms a pivotal abutment about which this holding cam may shift. A coil spring 48 encircles the shaft 20 and abuts against the partition member 36 and also against the opposed face of the cam 40 whereby normally to maintain the cam in the position shown in Figure 3. The operating cam 38 carries a lug 50 which is adapted to abut the opposite side of the internal partition 36. This cam at an opposite diametrical point carries a lug or extension 52 which is preferably formed as a single involute tooth adapted to normally lie between the adjacent involute teeth 32 and 34 of the lever actuator 30. A coil spring 54 encircles the shaft 20 and is confined between the end wall 56 of the housing member and the adjacent face of the actuating cam 38.

The base 2 at one end is provided with a substantially rectangular extension 60 which is drilled and provided with a rivet or other type of fastener 62 to hold thereto a link 64. The rivet forms a pivotal connection between the link 64 and the extension 60. This link and its riveted connection to the base extension 60 provide means for fastening the base 2 of each jack to a pipe section or to any other object with which the jacks are to be used. In the specific construction illustrated, the link 64 has a chain 66 passed therethrough. This chain is spiraled or coiled about a pipe section 68 in the manner shown in Figure 1. One end of the chain is provided with a hook 70 and the opposite end of the chain is provided with means 72 such as an appropriate link for engaging the hook. The chain may include any number of adjustable links 74 for adjusting the length of the chain. In the manner shown in Figure 1, the chain grips the pipe and holds the pair of jacks in clamped relation immovably to the pipe section 68. A chain 67 holds the shafts 20 in place.

One end of the long rod 20 is provided with a threaded portion 76 and the opposite end of the rod is likewise provided with another threaded section 78. An internally threaded sleeve 80 threads on to the threaded portion 76 of this rod 20 to provide a stop thereby preventing the rod 20 from being drawn too far into the housing portion 14 of the jack. Threaded to the opposite end of the rod 78 is an elongated hook-like member 82 having an upstanding hook 84 such as shown at the bottom portion of Figure 1, or a depending hook 84 such as shown at the top portion of Figure 1. It is to be understood that these hooks are so arranged such that these hook-like portions 84 extend inwardly toward each other. In addition the member 82 is provided with an outstanding pusher lug 86 the opposite member likewise being provided with a pusher lug 86. Each one of these hook-like elements 82 is internally threaded at its innermost end as at 88 to engage the threads 78 on the end of the rod 20. The threads 78 are of the same type as the threads 76 so that the stop collar 80 may be threaded on to the threads 78 and the hook members 82 may be reversely threaded on to the threads 76. This action permits the conversion of the jacks from a pulling function to a pushing function.

In the operation of the device as a puller jack or as a transit pipe joint puller for assembly of transit asbestos cement pipe, for instance, when the two jacks are assembled in the manner shown in Figure 1 and the jack levers 30 are operated, the actuating cams are tilted by the inter contact of the toothed elements 32 and 34 and 52 whereby to cant the actuating cam 38 into gripping contact with the rod 20. Since the housing is immovably held with respect to the pipe 68, the rods 20 will be drawn in the direction of the arrows to cause the hooks 84 engaging over the collar to pull the collar into frictional enveloping relation to the juxtaposed edges of the two pipe sections 68 and 69. It is to be understood that the holding cam 40 and the actuating cam 38 are alternately operated during this action, all as explained in my prior patents. In order to convert the jack assembly into a pushing action the stops 80 are unthreaded from the ends of the rods 20. So also the hook sections 82 are unthreaded from the opposite ends of the rods 20 and the housings and rods are reversed end to end and are clamped back into position as shown in Figure 5. The stop collar 80 is then threaded upon the threads 78 and the hook members 82 are threaded upon the threads 76 at the opposite ends of the rods 20. Upon operation of the actuating levers 30 the rods 20 are then moved longitudinally through the housings 14 in the opposite direction relative to the pipe, or as shown by arrows in Figure 5, and the pushing lugs 86 will serve to push the collar 87 from enveloping position covering the juxtaposed edges of the pipe sections 68 and 69.

It is to be understood that the utilization of these two jack constructions in the manner hereinbefore set forth is but illustrative of one adaptation of the invention. The constructions have other uses for pushing and pulling various objects, particularly round objects of elongated nature but the invention is not limited to the pushing and pulling of round objects.

It is apparent that many widely different embodiments of this invention may be made without departing from the spirit and scope thereof and therefore it is not intended to be limited except as indicated in the appended claims.

Having thus described the invention, what I claim is new and desire to secure by Letters Patent is:

1. A device of the class described comprising a pair of jacks, each jack comprising an elongated bracket having a base portion, each base portion having a concave rear face curved in a direction transversely of its elongated axis so that two of said bases may be clamped to substantially opposing exterior walls of a pipe section, each base portion including outstanding spaced bearings having registering openings therein, a housing having a substantially centralized elongated opening therethrough, said opening being likewise formed in the ends of said housing, an elongated shaft passing through the openings in the outstanding bearings of the base and through the opposed ends of the housing and lying substantially in the elongated opening of said housing, said housing being positioned between said bearings, apertured cam means disposed in said housing and through which the elongated shaft passes, actuating means pivotally mounted on said housing and contacting a portion of said cam means for tilting the same and for causing the elongated shaft to move endwise through the housing, another portion of said cam means having means serving to hold the shaft in shifted position and means carried by one end of said shaft forming a pulling hook for engaging a collar to pull the same over the juxtaposed abutting edges of two pipe sections, one of which pipe sections is the section to which the jacks are so clamped or fastened.

2. A device of the class described comprising a pair of jacks, each jack comprising an elongated bracket having a base portion, each base portion having a rear face formed as a portion of a cylinder so that two of said bases may be clamped to substantially opposing exterior peripheral walls of a pipe section, each base portion including outstanding bearings having registering openings therein, an elongated housing having a substantially centralized elongated opening therethrough, said opening being likewise formed in the opposed ends of said housing, an elongated shaft passing through the openings in the outstanding bearings of the base and through the openings in the opposed ends of the housing and lying substantially in the elongated opening of said housing, said housing lying between said outstanding bearings, a pair of apertured cams disposed in said housing and through which the elongated shaft passes, one of said cams being an actuating cam and the other a holding cam, actuating means pivotally mounted on said housing and contacting the actuating cam for tilting the same and for causing the elongated shaft to move endwise through the housing, the holding cam serving to hold the shaft in shifted position and means carried by one end of said shaft forming a pushing element whereby on actuation of the cam actuator said elongated shaft will be operated lengthwise to push the pushing element against a pipe joint overlying the abutting edges of two adjacent pipes, one of which pipes is the pipe to which the jacks are clamped or fastened as aforesaid.

3. A pipe jack or the like comprising a single elongated base having a pair of outstanding spaced apart lugs formed with registering perforations, a somewhat elongated substantially cylindrical housing resting on said base between said outstanding lugs, said housing having its ends formed with registering openings and said housing having an internal recess registering with said openings in its ends, an elongated longitudinally symmetrical shaft passing through the registering openings of the outstanding lugs of said base and passing axially through said housing, friction gripping cam means disposed in said housing and having spaced operating portions enveloping the shaft passing therethrough said cam means being capable of forcing said shaft in one direction only actuating means on the housing for tilting one of said cam operating cam portions to cause the same to grip the shaft and move the shaft endwise through the housing and with respect to the base, the other operating cam portion in said housing serving frictionally to grip and hold the shaft in any moved position, and a substantially L-shaped member mounted on either end of said shaft.

4. A pipe jack or the like comprising an elongated base having a pair of outstanding spaced apart lugs formed with registering perforations, a somewhat elongated substantially cylindrical housing disposed on said base between said outstanding lugs, said housing having its ends formed with registering openings and said housing having an internal recess registering with said openings in its ends, an elongated shaft passing through the registering openings of the outstanding lugs of said base and passing axially through said housing, the ends of said shaft being similar, similar attaching means at both ends of said shaft, friction gripping cams disposed in said housing and having portions enveloping the shaft passing therethrough, said cams being capable of forcing said shaft in only one direction, actuating means on the housing for tilting one of said cams to cause the same to grip the shaft and move the shaft endwise through the housing and with respect to the base, the other cam in said housing serving frictionally to grip and hold the shaft in any moved position, a substantially angle member attached to one end of said shaft, and a stop attached to the opposite end of said shaft, said member and said stop being interchangeable from one end of the shaft to the other.

5. A pipe jack or the like comprising an elongated base having a pair of outstanding spaced apart lugs formed with registering perforations, a somewhat elongated substantially cylindrical housing disposed on said base between said outstanding lugs, said housing having its ends formed with registering openings and said housing having an internal recess registering with said openings in its ends, an elongated longitudinally symmetrical shaft passing through the registering openings of the outstandings lugs of said base and passing axially through said housing, friction gripping cams disposed in said housing and having portions enveloping the shaft passing therethrough, said cams being capable of shifting said shaft in only one direction, actuating means on the housing for tilting one of said cams to cause the same to grip the shaft and move the shaft endwise through the housing and with respect to the base, the other cam in said housing serving frictionally to grip and hold the shaft in any moved position, a substantially angle member mounted on one end of said shaft, and means providing limited angular turning of said housing relatively to its base and concentrically about the elongated shaft.

6. A pipe jack or the like comprising an elongated base having a pair of outstanding spaced apart lugs formed with registering perforations, a somewhat elongated substantially cylindrical housing disposed on said base between said outstanding lugs, said housing having its ends formed with registering openings and said housing having an internal recess registering with said openings in its ends, an elongated longitudinally symmetrical shaft passing through the registering openings of the outstanding lugs of said base and passing axially through said housing, friction gripping cams disposed in said housing and having portions enveloping the shaft passing therethrough, for shifting said shaft in one direction only, actuating means on the housing for tilting one of said cams to cause the same to grip the shaft and move the shaft endwise through the housing and with respect to the base, the other cam in said housing serving frictionally to grip and hold the shaft in any moved position, a substantially angle member mounted on one end of said shaft, and lost motion means disposed on said base and on said housing for permitting the housing to be turned a limited angular amount axially about said shaft, said means including a pair of diametrically disposed outstanding lugs on said housing and said base including spaced apart abutment walls between which one of said lugs is adapted to project, the space between said walls on said base being wider than the width of an outstanding lug on said housing.

7. A pipe jack or the like comprising an elongated base having a pair of outstanding spaced apart lugs formed with registering perforations, a somewhat elongated substantially cylindrical housing disposed on said base between said outstanding lugs, said housing having its ends formed with registering openings and said housing having an internal recess registering with said openings in its ends, an elongated shaft passing through the registering openings of the outstanding lugs of said base and passing axially through said housing, friction gripping cams disposed in said housing and having portions enveloping the shaft passing therethrough for moving the shaft in one direction only actuating means on the housing for tilting one of said cams to cause the same to grip the shaft and move the shaft endwise through the housing and with respect to the base, the other cam in said housing serving frictionally to grip and hold the shaft in any moved position, the opposed ends of said elongated shaft having identical threads, a stop collar threadedly mounted on one of the threads of one of said ends of said shaft, and a threaded puller pusher member threadedly mounted on the thread of the opposite end of said shaft, said puller pusher member including a pulling abutment face whereby on attaching the base of the jack to a stationary object, the shaft may be moved through the housing on operation of the actuating lever to pull an object with respect to the base to which the jack is fastened or alternatively whereby on reversing the jack and its shaft end for end and fastening the same to a base and likewise transferring the stop member and puller pusher element to reversely located opposed ends of the shaft, said jack will operate as a pusher device on actuation of said actuating means, and interconnectible means on the base and on diametrically disposed portions of the housing for preventing unlimited rotation of the housing on the base.

8. In a device of the class described, a cradle like base having a curved rear face and means whereby the same may be fastened to a pipe section, said base having a plurality of spaced stops and reversibly outstanding spaced apart lugs provided with registering perforations, a substantially cylindrical housing having spaced end openings registerable with the openings in said outstanding lugs and having internal recesses registering with the end openings in said housing, an actuating cam mounted in said housing and a holding cam mounted in said housing, spring means operating on said cams, each of said cams having openings therethrough, an elongated shaft passing through the openings of said basal lugs and through the openings in said housing and through the openings in said cams, means pivotally mounted on said housing for actuating one of said cams to move the shaft axially of the housing in one direction only, said housing being shaped to reversibly fit between the outstanding lugs on said base whereby the cam actuating means may project outwardly away from said pipe section when clamped first in one position on one side of a pipe section and alternatively in a second position on diametrically the opposite side of said pipe section, and means disposed at diametrically opposite points on said housing for interengagement with and between spaced stops on the base for permitting the housing to be turned a limited amount only relatively to the base and concentrically about the axis of the elongated shaft.

9. In a pushing and pulling device, a reversible base having opposed outstanding lugs provided with registering perforations, a housing mounted on said base between said lugs and having end openings registering with the openings of said lugs, a shaft passing through the registering openings of said base and through said housing, a friction clamp in said housing adapted to engage the shaft and shift it in one direction only, an operating member on the housing for tilting the clamp into gripping engagement with the shaft, spring means in the housing for returning the clamp to normal and tilted position, the opposite ends of said shaft having identical threads, a stop member threadedly engaging one set of threads on one end of the shaft and a pushing and pulling member engaging the threads on the opposite end of said shaft whereby said stop and pushing and pulling members may be interchangeably threaded on the opposite ends of said shaft.

10. A pipe jack or the like comprising an elongated base having a pair of outstanding spaced apart lugs formed with registering perforations, a somewhat elongated substantially cylindrical housing disposed on said base between said outstanding lugs, said housing having its ends formed with registering openings and said housing having an internal recess registering with said openings in its ends, an elongated longitudinally substantially symmetrical shaft passing through the registering openings of the outstanding lugs of said base and passing axially through said housing, means in said housing for shifting said shaft axially therethrough, actuating means on said housing for operating said shifting means, an angle member mounted on one end of said shaft, and readily disengageable means on the housing and base providing limited angle turning of said housing relative to its base and concentrically about the elongated shaft.

11. A pipe jack or the like comprising an elongated base having a pair of outstanding spaced apart lugs formed with registering perforations, a somewhat elongated substantially cylindrical housing disposed on said base between said outstanding lugs, said housing having its ends formed with openings registering with the perforations in said lugs and said housing having an internal recess registering with the opening in its ends, an elongated longitudinally symmetrical shaft passing through the registering openings of the outstanding lugs of said base and passing axially through said housing, means in said housing for moving said shaft axially therethrough in one direction, means in said housing for preventing movement of said shaft in the opposite direction, actuating means on the housing for actuating said shaft moving means, a substantially L-shaped member mounted on one end of said shaft, and means on the base and on diametrically opposite portions of the housing providing limited angular turning of said housing relative to its base and concentric about the elongated shaft.

MILLARD B. LUCKER.

References Cited in the file of this patent

UNITED STATES PATENTS

| Number | Name | Date |
|---|---|---|
| 409,008 | Breymann | Aug. 13, 1889 |
| 1,894,835 | Smith et al. | Jan. 17, 1933 |
| 2,255,261 | Lucker | Sept. 9, 1941 |
| 2,535,078 | La Mont | Dec. 26, 1950 |

FOREIGN PATENTS

| Number | Country | Date |
|---|---|---|
| 22,723 | Great Britain | of 1906 |